United States Patent
Zhang

(10) Patent No.: US 9,876,817 B2
(45) Date of Patent: Jan. 23, 2018

(54) CLOUD CHECKING AND KILLING METHOD, DEVICE AND SYSTEM FOR COMBATING ANTI-ANTIVIRUS TEST

(71) Applicant: Beijing Qihoo Technology Company Limited, Xicheng District (CN)

(72) Inventor: Xu Zhang, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 0 days.

(21) Appl. No.: 15/033,566

(22) PCT Filed: Oct. 31, 2014

(86) PCT No.: PCT/CN2014/090030
§ 371 (c)(1),
(2) Date: Apr. 29, 2016

(87) PCT Pub. No.: WO2015/062541
PCT Pub. Date: May 7, 2015

(65) Prior Publication Data
US 2016/0285909 A1 Sep. 29, 2016

(30) Foreign Application Priority Data
Nov. 1, 2013 (CN) .......................... 2013 1 0534082

(51) Int. Cl.
*G06F 21/56* (2013.01)
*H04L 29/06* (2006.01)
*H04L 29/08* (2006.01)

(52) U.S. Cl.
CPC ...... *H04L 63/1441* (2013.01); *H04L 63/1425* (2013.01); *H04L 67/10* (2013.01)

(58) Field of Classification Search
CPC ..................................................... G06F 21/56
See application file for complete search history.

(56) References Cited

U.S. PATENT DOCUMENTS 7,849,502 B1 * 12/2010 Bloch ................. H04L 12/2602
726/11
8,661,547 B1 * 2/2014 Kononov ............. G06F 21/577
713/176
(Continued)

FOREIGN PATENT DOCUMENTS

CN 103136474 A 6/2013
CN 101901314 B 7/2013
(Continued)

OTHER PUBLICATIONS

Intenational Searching Authority (SIPO), International Search Report and Written Opinion in International Application No. PCT/CN2014/090030 dated Jan. 28, 2015.

*Primary Examiner* — Izunna Okeke
(74) *Attorney, Agent, or Firm* — LKGlobal | Lorenz & Kopf, LLP

(57) ABSTRACT

A cloud checking and killing method includes, but is not limited to, a cloud server receiving a cloud checking and killing request for performing virus checking and killing on a sample; the cloud server analyzes the cloud checking and killing request, and determines whether it is a cloud checking and killing request of an anti-antivirus test; if so, the cloud server returns a cloud checking and killing result that the sample does not carry a virus; and if not, comparing the sample with a virus library to determine whether the sample carries a virus and perform corresponding virus checking and killing. The cloud checking and killing does not return any virus information in an "anti-antivirus test", allowing the anti-antivirus test to pass. When a Trojan horse is spread online, the cloud checking and killing returns the correct result, thereby allowing antivirus software to kill the Trojan horse.

3 Claims, 3 Drawing Sheets

(56) References Cited

U.S. PATENT DOCUMENTS

| | | | |
|---|---|---|---|
| 2006/0230452 A1* | 10/2006 | Field .................... | G06F 21/56 726/22 |
| 2012/0304244 A1* | 11/2012 | Xie ...................... | G06F 21/00 726/1 |

FOREIGN PATENT DOCUMENTS

| | | |
|---|---|---|
| CN | 101924761 B | 11/2013 |
| CN | 102123396 B | 8/2014 |
| CN | 103581185 A | 12/2014 |
| CN | 102970272 B | 3/2015 |

* cited by examiner

CLOUD CHECKING AND KILLING METHOD, DEVICE AND SYSTEM FOR COMBATING ANTI-ANTIVIRUS TEST

CROSS-REFERENCE TO RELATED APPLICATIONS

This application is a U.S. National-Stage entry under 35 U.S.C. §371 based on International Application Number PCT/CN2014/090030, filed Oct. 31, 2014 which was published under PCT Article 21(2) and which claims priority to Chinese Application No. 201310534082.3 filed Nov. 1, 2013, which are all hereby incorporated in their entirety by reference.

TECHNICAL FIELD

This application pertains to the field of network security technologies, and particularly, to a cloud checking and killing method, device and system for combating an anti-antivirus test.

BACKGROUND

Nowadays, Trojan horses have been in an industrialized operation tendency for economic interests. Many Trojan horses are made by specialized "companies", and a complete organization chain of development→test→marketing has been formed. With the improvement of the users' network security awareness, most of the users have installed antivirus software at present, and a Trojan horse is deleted once being captured by the antivirus software. In order to maintain their economic interests, the Trojan horse "companies" try to avoid the checking and killing of the antivirus software by all means, wherein one means is "anti-antivirus test". That is to say, after a Trojan horse is developed by a development team of a "company", usually it is scanned with mainstream antivirus software by a test team. If being prompted as a virus in the scan, the Trojan horse cannot pass the test, and the development team will modify the Trojan horse until the antivirus software no longer give any prompt.

In that case, virus recognition methods of the traditional antivirus software are challenged. No matter how elaborate the design of the antivirus software is, the scanning result of particular software is fixed, either virus or non-virus. Thus, the Trojan horse "companies" can always find a method bypassing the detection of the antivirus software after multiple attempts, and then make and spread on the Internet a Trojan horse which cannot recognize by any antivirus software.

Therefore, it is urgent to provide a solution for combating an anti-antivirus test, so that the anti-antivirus test is invalid. In addition, other objects, desirable features and characteristics will become apparent from the subsequent summary and detailed description, and the appended claims, taken in conjunction with the accompanying drawings and this background.

SUMMARY

In view of the above problem, the present invention is proposed to provide a cloud checking and killing method, device and system for combating an anti-antivirus test, so as to overcome or at least partially solve the above problem.

According to one aspect of the present invention, there is provided a cloud checking and killing method for combating an anti-antivirus test, wherein a cloud checking and killing system comprises a cloud server and a client, the method comprising: receiving, by the cloud server, cloud checking and killing request sent by the client for performing virus checking and killing on a sample; analyzing, by the cloud server, the cloud checking and killing request, and determining whether the cloud checking and killing request is a cloud checking and killing request of an anti-antivirus test; if the cloud checking and killing request is a cloud checking and killing request of an anti-antivirus test, returning, by the cloud server, to the client a cloud checking and killing result that the sample does not carry a virus; and if the cloud checking and killing request is not a cloud checking and killing request of an anti-antivirus test, comparing the sample with a virus library of the cloud server to determine whether the sample carries a virus and performing corresponding virus checking and killing.

According to another aspect of the present invention, there is provided a cloud checking and killing device for combating an anti-antivirus test, wherein a cloud checking and killing system comprises a cloud server and a client, the device being located at the cloud server and comprising a recognizing engine and a virus library, wherein the device further comprises an anti-antivirus test recognizing module configured to analyze a cloud checking and killing request sent by the client for performing virus checking and killing on a sample, and determine whether the cloud checking and killing request is a cloud checking and killing request of an anti-antivirus test; if so, return to the client a cloud checking and killing result that the sample does not carry a virus; and if not, transfer the cloud checking and killing request not of the anti-antivirus test to the recognizing engine; and the recognizing engine is configured to compare the sample with a virus library of the cloud server to determine whether the sample carries a virus and perform corresponding virus checking and killing.

According to another aspect of the present invention, there is provided a cloud checking and killing system for combating an anti-antivirus test, comprising a cloud server and a client, the cloud server comprising a recognizing engine and a virus library, wherein the cloud server further comprises an anti-antivirus test recognizing module configured to analyze a cloud checking and killing request sent by the client for performing virus checking and killing on a sample, and determine whether the cloud checking and killing request is a cloud checking and killing request of an anti-antivirus test; if so, return to the client a cloud checking and killing result that the sample does not carry a virus; and if not, transfer the cloud checking and killing request not of the anti-antivirus test to the recognizing engine; and the recognizing engine is configured to compare the sample with a virus library of the cloud server to determine whether the sample carries a virus and perform corresponding virus checking and killing.

It is clear that in the present invention, if a cloud checking and killing request carrying out the "anti-antivirus test" is recognized, a cloud checking and killing result that the sample does not carry a virus is directly returned, so that the cloud checking and killing result does not indicate a virus; and if the checking and killing request is sent from an ordinary user, it is transferred to the recognizing engine, and a cloud checking and killing result determined by the recognizing engine through the virus library is returned. Thus, for the cloud checking and killing request of the "anti-antivirus test", a cloud checking and killing result that no virus is carried is returned, so that the virus (e.g., Trojan horse) tester mistakenly believes that the cloud checking and killing request passes the anti-antivirus test and releases the virus. But when the virus is subsequently carried by the client of an ordinary user, it can be normally checked and killed by the cloud checking and killing system. In the method of the present invention, the cloud checking and killing does not return any virus information during an "anti-antivirus test" to enable a Trojan horse to pass the anti-antivirus test, while when the Trojan horse is really spread in the Internet, the cloud checking and killing returns a correct result so that the antivirus software kills the Trojan horse.

The above descriptions just summarize the technical solutions of the present invention, which can be embodied based on the content of the Description so as to understand the technical means of the present invention more clearly. Furthermore, in order to enable the above and other objects, features and advantages of the present invention to be understood more obviously and easily, the embodiments of the present invention are specifically given as follows.

BRIEF DESCRIPTION OF THE DRAWINGS

The present invention will hereinafter be described in conjunction with the following drawing figures, wherein like numerals denote like elements, and the same part is denoted with the same reference signs throughout the drawings. In which.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The exemplary embodiments of the present disclosure will be described more detailed with reference to the drawings. Although the drawings illustrate the exemplary embodiments of the present disclosure, it shall be appreciated that the present disclosure can be implemented in various ways, rather than being restricted by the embodiments elaborated herein. On the contrary, those embodiments are provided for understanding the present disclosure more thoroughly, and communicating the range of the present disclosure to those skilled in the art completely.

A complete Trojan horse package program includes two parts: a service end (server part) and a client (controller part). The service end is implanted into a target computer, and the hacker enters the computer running the service end just through the client. After the service end of the Trojan horse is run, a process with a name that can easily confuse the user will be produced to open some ports furtively and transmit data (e.g., the password of an online game, the password of instant messaging software, and the user's Internet password) to a designated place. The hacker can even enter the computer system through the opened ports.

Figure 1:
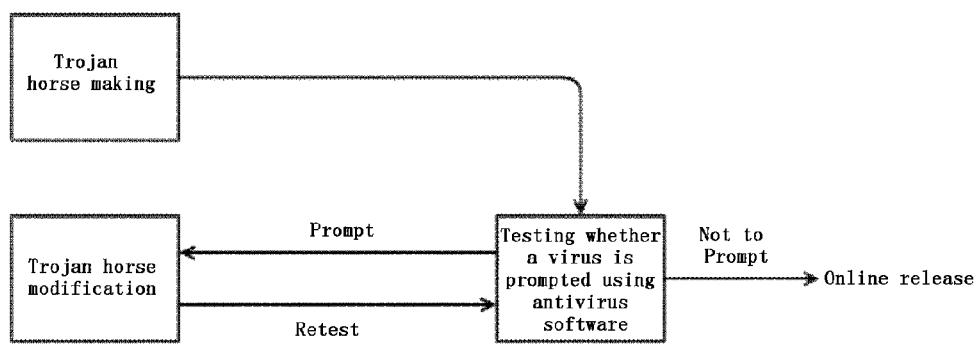
FIG. 1 illustrates a schematic diagram of an anti-antivirus test.

Referring to FIG. 1, which is a flowchart of an anti-antivirus test. The traditional antivirus software recognizes a virus in milliseconds. That is to say, when a Trojan horse is made, a result can be obtained almost immediately by "testing whether a virus is prompted using antivirus software". Next, the developer modifies the Trojan horse, which can be retested at once after the modification, and the time cost for repeating the test for several times is not high.

Based on the above analysis, the inventor of the present invention finds that if the time for "testing whether a virus is prompted using antivirus software" is prolonged reasonably, the time of the whole procedure of "anti-antivirus test" will be very long, thereby greatly increasing the time cost and reducing the economic interests of the Trojan horse. However, the ordinary users require the time for virus prompt to be as short as possible. Thus the key of the patent is to return a result immediately to the ordinary users, while greatly prolong the test time for the Trojan horse "companies".

The so called cloud checking and killing means placing virus samples into servers, and automatically determining whether a file is a virus through intelligent detections at hundreds of servers. It is clear that the cloud checking and killing system comprises a cloud server and a client. The cloud checking and killing is only effective through networking, because the server of the antivirus software cannot be connected unless networking is achieved, so as to carry out the checking and killing quickly and reduce accidental killing.

In the traditional cloud checking and killing system, the cloud server and the client are communicated with each other through network connections. The cloud server mainly comprises a recognizing engine and a virus library, wherein the recognizing engine compares a target file (also referred to as sample) with the virus library, and determines whether the target file carries a virus.

Figure 2:
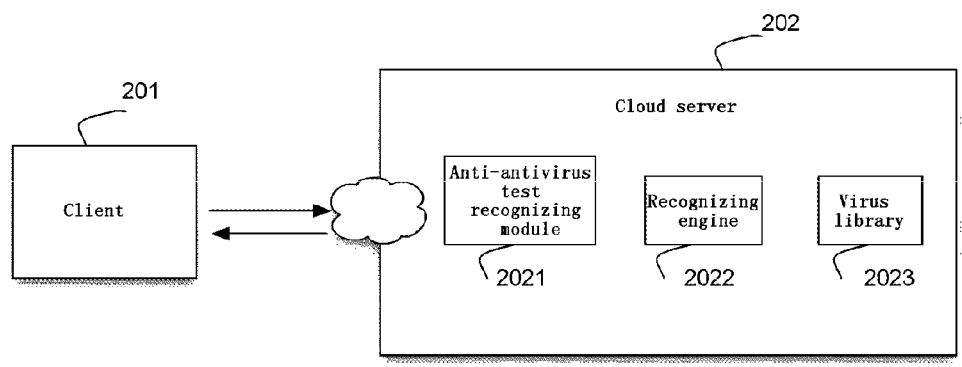
FIG. 2 illustrates a block diagram of a cloud checking and killing system for combating an anti-antivirus test according to an embodiment of the present invention.

In the present invention, an anti-antivirus test recognizing module is added before the "recognizing engine" at the cloud server of the cloud checking and killing system. Referring to FIG. 2, which is a block diagram of a cloud checking and killing system for combating an anti-antivirus test according to an embodiment of the present invention. The cloud checking and killing system comprises a client 201 and a cloud server 202 connected to each other through a network. In which, the client is a user terminal such as smart phone terminal or PC terminal. The cloud server 202 comprises an anti-antivirus test recognizing module 2021, a recognizing engine 2022 and a virus library 2023.

The anti-antivirus test recognizing module 2021 is mainly used to recognize whether the cloud checking and killing request is a cloud checking and killing request of the anti-antivirus test; if so, it directly returns to the client 201 through a network a checking and killing result like "unknown" or "safe" to indicate that the target file is not a virus; if the anti-antivirus test recognizing module 2021 recognizes that the cloud checking and killing request is not a cloud checking and killing request of the anti-antivirus test, but a checking and killing request sent from an ordinary user, it further transfers the checking and killing request to the recognizing engine 2022, which inquires the virus library 2023 in the original procedure to determine whether the target file carries a virus and returns a checking and killing result to the client 201.

It is clear that in the present invention, if a cloud checking and killing request carrying out the "anti-antivirus test" is recognized, a value such as "unknown" or "safe" is directly returned, so that the cloud checking and killing result does not indicate a virus; and if the checking and killing request is sent from an ordinary user, it is transferred to the recognizing engine, and a value of the recognizing engine is returned.

Thus, for the cloud checking and killing request of the "anti-antivirus test", a value such as "unknown" or "safe" is returned, so that the virus (e.g., Trojan horse) tester mistakenly believes that the cloud checking and killing request passes the anti-antivirus test and releases the virus. But when the virus is subsequently carried by the client of an ordinary user, it can be normally checked and killed by the cloud checking and killing system.

The anti-antivirus test recognizing module 2021 may recognize whether the cloud checking and killing request is a cloud checking and killing request of the anti-antivirus test in several ways.

Next, how to determine a cloud checking and killing request of the "anti-antivirus test" is being performed will be introduced in details.

(1) Blacklist of IPs

The anti-antivirus test recognizing module 2021 may count the number of requests from an IP, an IP section or an area corresponding to the IP in a unit time (e.g., one day), and if the number exceeds a reasonable value, it is possible that a professional tester is testing the cloud checking and killing interface. Thus the IP is automatically added into a blacklist and no virus information will be returned for any request thereof.

(2) Blacklist of Device Identification Numbers

The cloud checking and killing is initiated by the antivirus software client, which can usually collect the identification numbers of user equipment (e.g., the MAC address of a PC, the IMEI number of a cellular phone, etc.). Similar to the backlist of IPs, if the number of requests from a device identification number exceeds a reasonable value in a unit time, the device identification number is also automatically added into the blacklist.

(3) Requesting Times and Distribution Characteristics of Request Sample

Since software in testing is not released to the public on a large scale, the counted total number of requests is small. For example, a Trojan horse in testing may be only tested by several testers, thus just a few requests for the sample may be counted. While the requests for an application actually released to the public are distributed all over the country (which can be seen from the request IPs), and the requests are much more. Specifically, for each sample requested, the anti-antivirus test recognizing module 2021 records a unique identification characteristic (e.g., file MD5) of the sample and the request IPs; analyzes the above records periodically and filters out samples smaller than a set value according to the number and distribution of the request IPs. For example, in the test of a new Trojan horse, there are usually a limited number of cloud checking and killing requests sent from few terminals with adjacent IP distributions. Assuming that the IPs of a cloud checking and killing request for a particular sample (identified by a unique identification characteristic) are within a set condition, e.g., the IP distributions are adjacent to each other and the total number of the request IPs is less than or equal to 10, it can be deemed that the cloud checking and killing request for the particular sample is a cloud checking and killing request of an anti-antivirus test.

In the above way, the cloud checking and killing does not return any virus information during an "anti-antivirus test" to enable a Trojan horse to pass the anti-antivirus test, while when the Trojan horse is really spread on the Internet, the cloud checking and killing returns a correct result so that the antivirus software kills the Trojan horse.

Figure 3:
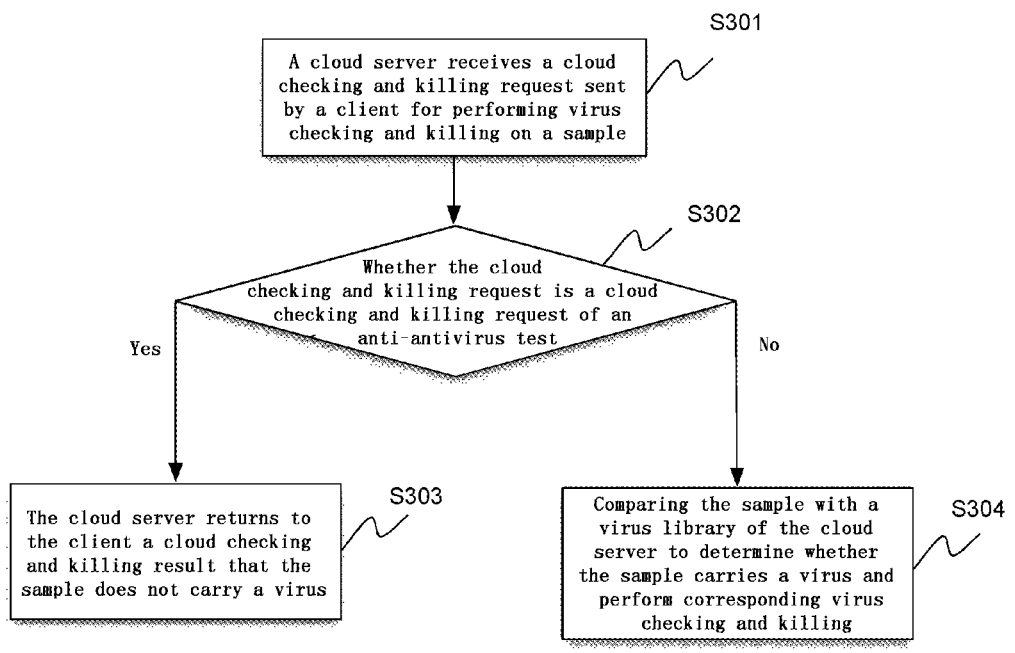
FIG. 3 illustrates a flowchart of a cloud checking and killing method for combating an anti-antivirus test according to an embodiment of the present invention.

Referring to FIG. 3, which is a flowchart of a cloud checking and killing method for combating an anti-antivirus test according to an embodiment of the present invention. As mentioned above, the cloud checking and killing system comprises a cloud server and a client, and the method comprises:

S301: a cloud server receives a cloud checking and killing request sent by a client for performing virus checking and killing on a sample;

S302: the cloud server analyzes the cloud checking and killing request, and determines whether the cloud checking and killing request is a cloud checking and killing request of an anti-antivirus test; if so, performing S303, and if not, performing S304;

S303: if the cloud checking and killing request is a cloud checking and killing request of an anti-antivirus test, the cloud server returns to the client a cloud checking and killing result that the sample does not carry a virus;

S304: if the cloud checking and killing request is not a cloud checking and killing request of an anti-antivirus test, comparing the sample with a virus library of the cloud server to determine whether the sample carries a virus and perform corresponding virus checking and killing.

In which, there are several ways for determining whether the cloud checking and killing request is a cloud checking and killing request of an anti-antivirus test.

For example, one way is to record an IP sending the cloud checking and killing request, and determine whether the IP of the cloud checking and killing request is in a preset blacklist of IPs; if so, determine that the cloud checking and killing request is a cloud checking and killing request of an anti-antivirus test, wherein the blacklist of IPs is preset by establishing an empty list and adding qualified "black IPs" therein through a statistical determination. Specifically, counting the number of cloud checking and killing requests sent from an IP in a unit time, and if the number of cloud checking and killing requests sent from the IP in the unit time is larger than a preset request threshold, adding the IP into the blacklist of IPs.

For example, another way is to record an identification number of the client sending the cloud checking and killing request, and determine whether the identification number is in a preset blacklist of device identification numbers; if so, determine that the cloud checking and killing request is a cloud checking and killing request of an anti-antivirus test, wherein the blacklist of device identification numbers is preset by establishing an empty list and adding qualified black identification numbers of clients therein through a statistical determination. Specifically, counting the number of cloud checking and killing requests sent from a client corresponding to a device identification number in a unit time, and if the number of cloud checking and killing requests sent from the client corresponding to the device identification number in the unit time is larger than a preset request threshold, adding the device identification number into the blacklist of device identification numbers.

For example, still another way is to record a unique identification characteristic of the sample, monitor a cloud checking and killing request sent for the unique identification characteristic, and count the number and distribution of IPs of the cloud checking and killing request sent for the unique identification characteristic; if a counting result falls within a preset condition, determine that the cloud checking and killing request is a cloud checking and killing request of an anti-antivirus test.

In the method of the present invention, the cloud checking and killing does not return any virus information in an "anti-antivirus test", thereby allowing the anti-antivirus test to pass. When a Trojan horse is actually spread online, the cloud checking and killing returns the correct result, thereby allowing antivirus software to kill the Trojan horse.

In correspondence with the above method, the present invention further provides a cloud checking and killing device for combating an anti-antivirus test. As mentioned above, the cloud checking and killing system comprises a cloud server and a client, and the device of the present invention is located at the cloud server, comprising a recognizing engine and a virus library, and particularly further comprising an anti-antivirus test recognizing module.

In which, the anti-antivirus test recognizing module is configured to analyze a cloud checking and killing request sent by the client for performing virus checking and killing on a sample, and determine whether the cloud checking and killing request is a cloud checking and killing request of an anti-antivirus test; if so, return to the client a cloud checking and killing result that the sample does not carry a virus; and if not, transfer the cloud checking and killing request not of the anti-antivirus test to the recognizing engine;

the recognizing engine is configured to compare the sample with a virus library of the cloud server to determine whether the sample carries a virus and perform corresponding virus checking and killing.

Preferably, there are several ways for the anti-antivirus test recognizing module to determine whether the cloud checking and killing request is a cloud checking and killing request of the anti-antivirus test.

One way is to determine a cloud checking and killing request of an anti-antivirus test through a blacklist of IPs. At that time, the anti-antivirus test recognizing module comprises a blacklist of IPs setting unit configured to set and save a blacklist of IPs; a recording unit configured to record an IP sending the cloud checking and killing request; a determining unit configured to determine whether the IP of the cloud checking and killing request is in the blacklist of IPs; if so, determine that the cloud checking and killing request is a cloud checking and killing request of the anti-antivirus test, wherein the blacklist of IPs setting unit is configured to count the number of cloud checking and killing requests sent from an IP in a unit time, and if the number of cloud checking and killing requests sent from the IP in the unit time is larger than a preset request threshold, add the IP into the blacklist of IPs.

Another way is to determine a cloud checking and killing request of an anti-antivirus test through a blacklist of device identification numbers. At that time, the anti-antivirus test recognizing module comprises: a blacklist of device identification numbers setting unit, configured to set and save a blacklist of device identification numbers; a recording unit configured to record an identification number of a client sending the cloud checking and killing request; a determining unit configured to determine whether the identification number is in the blacklist of device identification numbers; if so, determine that the cloud checking and killing request is a cloud checking and killing request of an anti-antivirus test, wherein the blacklist of device identification numbers setting unit is configured to count the number of cloud checking and killing requests sent from a client corresponding to a device identification number in a unit time, and if the number of cloud checking and killing requests sent from the client corresponding to the device identification number in the unit time is larger than a preset request threshold, add the device identification number into the blacklist of device identification numbers.

Still another way is to determine a cloud checking and killing request of an anti-antivirus test through a unique identification characteristic of sample and counting the number and distribution of IPs. At that time, the anti-antivirus test recognizing module comprises: a recording unit configured to record a unique identification characteristic of the sample; a monitoring and counting unit configured to monitor a cloud checking and killing request sent for the unique identification characteristic, and count the number and distribution of IPs of the cloud checking and killing request sent for the unique identification characteristic; and a determining unit configured to determine that the cloud checking and killing request is a cloud checking and killing request of an anti-antivirus test, if a counting result of the number and distribution of IPs obtained by the monitoring and counting unit falls within a preset condition.

It is clear that in the present invention, if a cloud checking and killing request carrying out the "anti-antivirus test" is recognized, a cloud checking and killing result that the sample does not carry a virus is directly returned, so that the cloud checking and killing result does not indicate a virus; and if the checking and killing request is sent from an ordinary user, it is transferred to the recognizing engine, and a cloud checking and killing result determined by the recognizing engine through the virus library is returned. Thus, for the cloud checking and killing request of the "anti-antivirus test", a cloud checking and killing result that no virus is carried is returned, so that the virus (e.g., Trojan horse) tester mistakenly believes that the cloud checking and killing request passes the anti-antivirus test and releases the virus. But when the virus is subsequently carried by the client of an ordinary user, it can be normally checked and killed by the cloud checking and killing system.

In the method of the present invention, the cloud checking and killing does not return any virus information during an "anti-antivirus test" to enable a Trojan horse to pass the anti-antivirus test, while when the Trojan horse is really spread on the Internet, the cloud checking and killing returns a correct result so that the antivirus software kills the Trojan horse.

The algorithms and displays provided herein are not inherently related to any particular computer, virtual system or other device. Various general systems can also be used based on the teachings herein. The structure required for constructing those systems is obvious from the above descriptions. In addition, the present invention is not proposed for any particular programming language. It shall be understood that the content of the present invention described herein can be implemented with various programming languages, and the above descriptions for the particular language are made to reveal the optimal embodiment of the present invention.

Although many details are described herein, it shall be appreciated that the embodiments of the present invention can be practiced without those details. Some examples do not illustrate the known method, structure and technology in details, so as not to obfuscate the comprehension of the Specification.

Similarly, it shall be appreciated that in order to simplify the present disclosure and promote the comprehension of one or more aspects of the present invention, the features of the present invention sometimes are grouped into a single embodiment, drawing or description thereof, in the above descriptions of the exemplary embodiments of the present invention. However, the method of the disclosure shall not be interpreted as reflecting such an intention that the claimed invention requires more features than each claim. To be more precise, as reflected by the following claims, the features of the aspects of the invention are less than all the features of a single embodiment disclosed previously. The claims in conformity with a specific embodiment are thereby explicitly incorporated therein, wherein each claim is a single embodiment of the present invention.

It will be appreciated by those skilled in the art that modules in a device of an embodiment can be adaptively changed and disposed one or more devices different from the embodiment. Modules, units or components in an embodiment may be combined into one module, unit or component, or each of them may be divided into a plurality of submodules, sub-units or sub-components. Except that at least some of those features and/or processes or units are mutually exclusive, all features disclosed herein (including the accompanying claims, Abstract and drawings) and all processes or units of any method or apparatus thus disclosed can be combined in any way. Unless otherwise specified, each feature disclosed herein (including the accompanying claims, Abstract and drawings) may be replaced by a same, equivalent or similar substitutive feature.

In addition, it can be appreciated by those skilled in the art that although some embodiments described herein include certain features of other embodiment, rather than other features, any combination of features of different embodiments falls within the scope of the present invention and forms a different embodiment. For example, in the following claims, any one of the claimed embodiments may be used by being randomly combined.

The embodiments of various parts of the present invention may be implemented with hardware, software modules running on one or more processors, or combinations thereof. It shall be appreciated by those skilled in the art that some or all functions of some or all parts in a cloud checking and killing device for combating an anti-antivirus test according to an embodiment of the present invention may be realized with a microprocessor or a digital signal processor (DSP) in practice. The present invention may also be implemented as a device or apparatus program (e.g., computer program and computer program product) to execute the method described herein partially or entirely. Such a program for implementing the present invention may be stored in a computer readable program, or in form of one or more signals. Such signals may be downloaded from Internet websites, or provided by carrier signals or provided in any other way.

Figure 4:
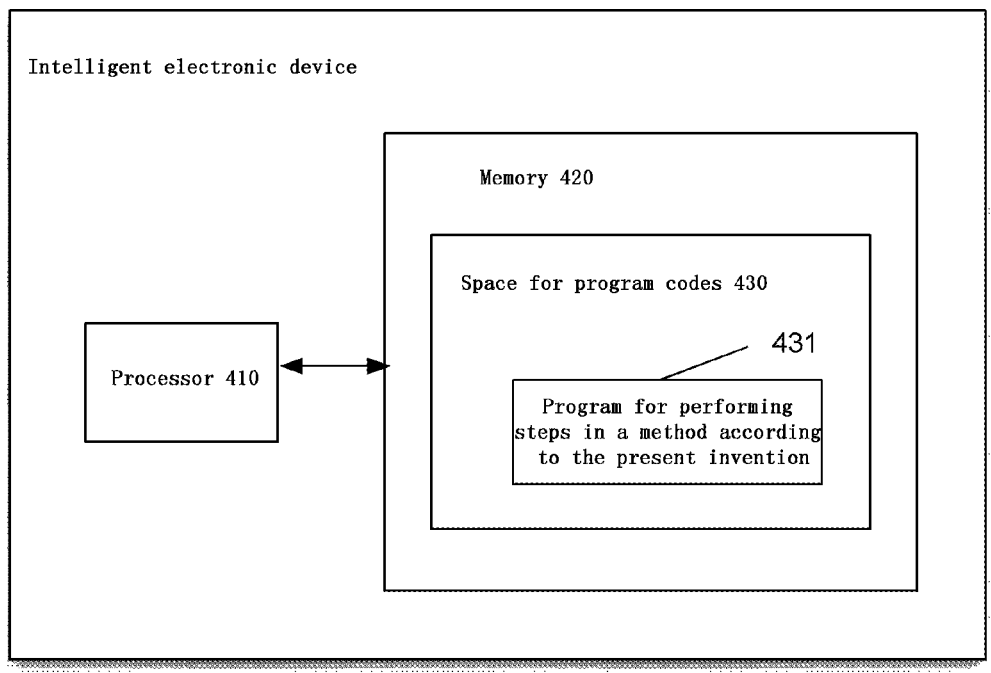
FIG. 4 illustrates a block diagram of an intelligent electronic device for performing the method according to the present invention.
Figure 5:
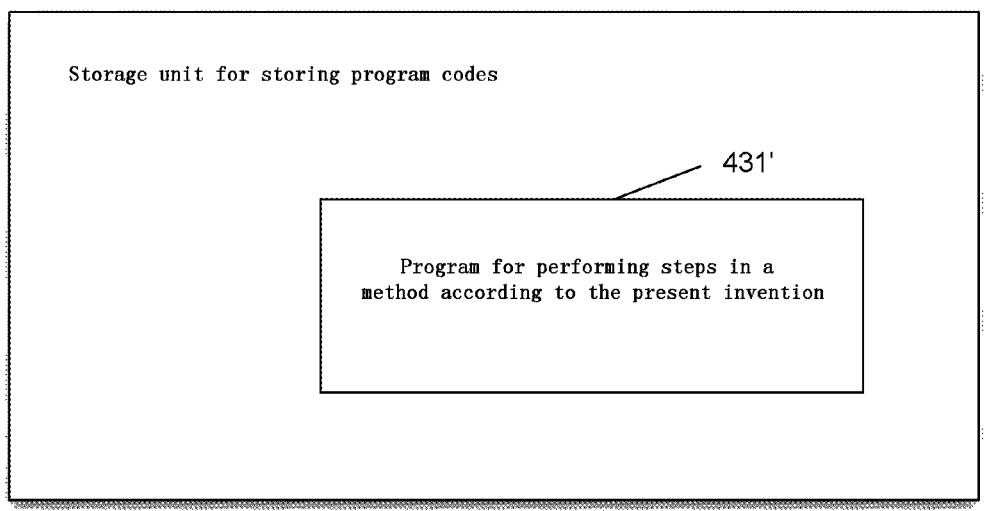
FIG. 5 illustrates a schematic diagram of a storage unit for preserving or carrying program codes of the method according to the present invention.

For example, FIG. 4 illustrates an intelligent electronic device capable of implementing a cloud checking and killing device for combating an anti-antivirus test according to the present invention. The intelligent electronic device conventionally comprises a processor 410 and a computer program product or a computer readable medium in the form of a memory 420. The memory 420 may be an electronic memory such as flash memory, Electrically Erasable Programmable Read-Only Memory (EEPROM), EPROM, hard disk, or ROM. The memory 420 has a storage space 430 for program codes 431 which perform any step in the above method. For example, the storage space 430 for program codes may include various program codes 431 which perform each step in the above method. Those program codes may be read from or written into the one or more computer program products. Those computer program products include program code carriers such as hard disk, Compact Disk (CD), memory card or floppy disk. Such a computer program product usually is a portable or fixed storage unit as shown in FIG. 5. The storage unit may have a storage section or a storage space arranged similarly to the memory 420 in the intelligent electronic device of FIG. 4. The program codes for example may be compressed in an appropriately form. Generally, the storage unit includes a program 431' which performs steps of a method according to the present invention, i.e., codes readable to a processor such as 410. When being run by the intelligent electronic device, those codes cause the intelligent electronic device to perform each step in the method described above.

To be noted, the above embodiments are just descriptions of the present invention rather than limitations thereto. In addition, those skilled in the art can design a substitutive embodiment without deviating from the scope of the accompanying claims. In the claims, any reference sign in parentheses shall not be constructed as a limitation to the claims. The term "comprise/include" does not exclude any element or step not listed in the claims. The term "one" in front of an element does not exclude a situation that there are multiple such elements. The present invention can be implemented by hardware having several different elements, and a computer programmed appropriately. In a unit claim listing several devices, some of those devices may be specifically reflected by the same hardware item. The usage of the terms "first", "second" and "third" does not indicate any sequence. Those terms may be construed as names.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

The invention claimed is:

1. A cloud checking and killing method for combating an anti-antivirus test, comprising:
   receiving, by a cloud sever, cloud checking and killing request sent by a client for performing virus checking and killing on a sample;
   analyzing, by the cloud server, the cloud checking and killing request, and determining whether the cloud checking and killing request is a cloud checking and killing request of an anti-antivirus test;
   if the cloud checking and killing request is a cloud checking and killing request of an anti-antivirus test, returning, by the cloud server, to the client a cloud checking and killing result that the sample does not carry a virus;
   if the cloud checking and killing request is not a cloud checking and killing request of an anti-antivirus test, comparing the sample with a virus library of the cloud server to determine whether the sample carries a virus and performing corresponding virus checking and killing;
   the determining whether the cloud checking and killing request is a cloud checking and killing request of an anti-antivirus test comprises at least one of:

recording a unique identification characteristic of the sample; monitoring a cloud checking and killing request sent for the unique identification characteristic, and counting the number and distribution of IPs of the cloud checking and killing request sent for the unique identification characteristic; if a counting result falls within a preset condition, determining that the cloud checking and killing request is a cloud checking and killing request of an anti-antivirus test; or recording an identification number of a client sending the cloud checking and killing request; determining whether the identification number is in a preset blacklist of device identification numbers; and if so, determining that the cloud checking and killing request is a cloud checking and killing request of an anti-antivirus test; wherein the blacklist of device identification numbers is preset by: counting the number of cloud checking and killing requests sent from a client corresponding to a device identification number in a unit time; if the number of cloud checking and killing requests sent from the client corresponding to the device identification number in the unit time is larger than a preset request threshold, adding the device identification number into the blacklist of device identification numbers.

2. A cloud checking and killing device for combating an anti-antivirus test, the device being located at the cloud server and comprising one or more non-transitory computer readable medium configured to store computer-executable instruction and a virus library, wherein the device further comprises at least one processor to execute the instructions to cause:

analyzing a cloud checking and killing request sent by the client for performing virus checking and killing on a sample, and determining whether the cloud checking and killing request is a cloud checking and killing request of an anti-antivirus test;

if so, returning to the client a cloud checking and killing result that the sample does not carry a virus;

and if not, comparing the sample with a virus library of the cloud server to determine whether the sample carries a virus and perform corresponding virus checking and killing;

the determining whether the cloud checking and killing request is a cloud checking and killing request of an anti-antivirus test comprises at least one of:

recording a unique identification characteristic of the sample; monitoring a cloud checking and killing request sent for the unique identification characteristic, and counting the number and distribution of IPs of the cloud checking and killing request sent for the unique identification characteristic; determining that the cloud checking and killing request is a cloud checking and killing request of an anti-antivirus test, if a counting result of the number and distribution of IPs falls within a preset condition; or recording an identification number of a client sending the cloud checking and killing request;

determining whether the identification number is in a preset blacklist of device identification numbers; and if so, determining that the cloud checking and killing request is a cloud checking and killing request of an anti-antivirus test; wherein the setting and saving a blacklist of device identification numbers comprises: counting the number of cloud checking and killing requests sent from a client corresponding to a device identification number in a unit time; if the number of cloud checking and killing requests sent from the client corresponding to the device identification number in the unit time is larger than a preset request threshold, adding the device identification number into the blacklist of device identification numbers.

3. A cloud checking and killing system for combating an anti-antivirus test, comprising a cloud server and a client, the cloud server comprising one or more non-transitory computer readable medium configured to store computer-executable instruction and a virus library, wherein the cloud server further comprises at least one processor to execute the instructions to cause:

analyzing a cloud checking and killing request sent by the client for performing virus checking and killing on a sample, and determining whether the cloud checking and killing request is a cloud checking and killing request of an anti-antivirus test;

if so, returning to the client a cloud checking and killing result that the sample does not carry a virus; and if not, comparing the sample with a virus library of the cloud server to determine whether the sample carries a virus and perform corresponding virus checking and killing;

the determining whether the cloud checking and killing request is a cloud checking and killing request of an anti-antivirus test comprises at least one of:

recording a unique identification characteristic of the sample; monitoring a cloud checking and killing request sent for the unique identification characteristic, and counting the number and distribution of IPs of the cloud checking and killing request sent for the unique identification characteristic; determining that the cloud checking and killing request is a cloud checking and killing request of an anti-antivirus test, if a counting result of the number and distribution of IPs falls within a preset condition; or recording an identification number of a client sending the cloud checking and killing request; determining whether the identification number is in a preset blacklist of device identification numbers; and if so, determining that the cloud checking and killing request is a cloud checking and killing request of an anti-antivirus test; wherein the setting and saving a blacklist of device identification numbers comprises: counting the number of cloud checking and killing requests sent from a client corresponding to a device identification number in a unit time; if the number of cloud checking and killing requests sent from the client corresponding to the device identification number in the unit time is larger than a preset request threshold, adding the device identification number into the blacklist of device identification numbers.

* * * * *